(12) United States Patent
Mantin et al.

(10) Patent No.: US 8,417,963 B2
(45) Date of Patent: Apr. 9, 2013

(54) SECURE READ-WRITE STORAGE DEVICE (75) Inventors: Itsik Mantin, Shoham (IL); Perry Smith, Maale Adumim (IL); Yaron Sella, Yehud (IL); Erez Waisbard, Or Yehuda (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/083,023

(22) PCT Filed: Nov. 13, 2006

(86) PCT No.: PCT/IL2006/001298
§ 371 (c)(1),
(2), (4) Date: May 6, 2008

(87) PCT Pub. No.: WO2007/054942
PCT Pub. Date: May 18, 2007

(65) Prior Publication Data
US 2009/0070596 A1 Mar. 12, 2009

(30) Foreign Application Priority Data
Nov. 14, 2005 (IL) .......................................... 171963

(51) Int. Cl.
*G06F 21/00* (2006.01)
(52) U.S. Cl.
USPC .............................. 713/189; 713/194; 726/26
(58) Field of Classification Search .................. 713/189, 713/194; 726/26
See application file for complete search history.

(56) References Cited

U.S. PATENT DOCUMENTS

| | | | |
|---|---|---|---|
| 5,375,243 A | 12/1994 | Parzych et al. | |
| 5,481,720 A | 1/1996 | Loucks et al. | 395/700 |
| 5,533,123 A | 7/1996 | Force et al. | |
| 5,915,018 A | 6/1999 | Aucsmith | 380/4 |
| 6,021,510 A * | 2/2000 | Nachenberg | 714/38.14 |
| 6,056,193 A | 5/2000 | McAuliffe et al. | |
| 6,182,223 B1 | 1/2001 | Rawson | |
| 7,168,010 B2 * | 1/2007 | Yadavalli et al. | 714/42 |
| 7,340,776 B2 * | 3/2008 | Zobel et al. | 726/24 |
| 7,493,534 B2 * | 2/2009 | Pomaranski et al. | 714/723 |
| 7,526,274 B2 * | 4/2009 | Bernard et al. | 455/411 |
| 2001/0054144 A1 * | 12/2001 | Epstein et al. | 713/161 |
| 2002/0002683 A1 | 1/2002 | Benson et al. | |

(Continued)

FOREIGN PATENT DOCUMENTS

| | | |
|---|---|---|
| EP | 0 174 472 | 3/1986 |
| EP | 0 448 262 A2 | 9/1991 |

(Continued)

OTHER PUBLICATIONS

Dec. 1, 2009 Office Communication in connection with IL 171963 (w/Eng translation) (3 pgs.).

(Continued)

*Primary Examiner* — Michael Pyzocha
(74) *Attorney, Agent, or Firm* — Husch Blackwell LLP (57) ABSTRACT

A method is described for securing a read write storage (RWS) device, the method comprising, providing the RWS device, the RWS device comprising a controller comprising a processor and a bit bucket and employing, in response to a decision making process, a sanction in the RWS device. Related apparatus and methods are also described.

17 Claims, 2 Drawing Sheets

---

PROVIDE A READ-WRITE STORAGE DEVICE COMPRISING A PHYSICAL STORAGE MODULE AND A CONTROLLER, THE CONTROLLER COMPRISING A PROCESSOR

EMPLOY A SANCTION IN THE READ-WRITE STORAGE DEVICE IN RESPONSE TO A DECISION MAKING PROCESS

U.S. PATENT DOCUMENTS

| | | | |
|---|---|---|---|
| 2002/0087882 A1 | 7/2002 | Schneier et al. | |
| 2003/0009693 A1* | 1/2003 | Brock et al. | 713/201 |
| 2003/0079122 A1 | 4/2003 | Asokan et al. | 713/156 |
| 2003/0149914 A1 | 8/2003 | Kim | |
| 2003/0163653 A1* | 8/2003 | Skendzic et al. | 711/153 |
| 2003/0163729 A1* | 8/2003 | Buchegger | 713/201 |
| 2004/0022086 A1* | 2/2004 | Nguyen et al. | 365/185.09 |
| 2004/0052110 A1* | 3/2004 | Nguyen et al. | 365/185.04 |
| 2004/0111613 A1 | 6/2004 | Shen-Orr et al. | 713/165 |
| 2004/0223358 A1* | 11/2004 | Yamamoto | 365/145 |
| 2004/0257102 A1 | 12/2004 | Wong et al. | |
| 2005/0047594 A1 | 3/2005 | Cho et al. | |
| 2005/0071656 A1* | 3/2005 | Klein et al. | 713/193 |
| 2005/0161253 A1* | 7/2005 | Heitmann et al. | 174/261 |
| 2006/0020823 A1 | 1/2006 | Morino | 713/193 |
| 2006/0021028 A1* | 1/2006 | Brunette et al. | 726/22 |
| 2006/0048223 A1 | 3/2006 | Lee et al. | |
| 2006/0117383 A1 | 6/2006 | Noh et al. | |
| 2006/0149969 A1* | 7/2006 | Song | 713/182 |
| 2006/0184764 A1* | 8/2006 | Osaki | 711/216 |
| 2007/0069875 A1* | 3/2007 | Doi | 340/440 |
| 2007/0150681 A1* | 6/2007 | Frank et al. | 711/163 |
| 2008/0209232 A1 | 8/2008 | Kudelski et al. | |

FOREIGN PATENT DOCUMENTS

| | | |
|---|---|---|
| EP | 1 577 734 A2 | 9/2005 |
| WO | WO 02/05098 A1 | 1/2002 |
| WO | WO 02/079955 | 10/2002 |
| WO | WO 03/034428 | 4/2003 |
| WO | WO 03/034650 | 4/2003 |

OTHER PUBLICATIONS

A. Menezes et al., *Handbook of Applied Cryptography*, pp. 321-382 and 433-438 (CRC Press 1996).

Nov. 12, 2009 Supplementary European Search Report for EP 0680 9858.

Dorothy E. Denning, "An Intrusion-Detection Model," IEEE Transactions on Software Engineering, vol. SE-13, No. 2 (Feb. 1987).

Apr. 21, 2011 Office Communication in connection with prosecution of EP 06 809 858.1.

Nov. 2, 2011 Office Communication in connection with prosecution of IL 190680 (with English Translation).

Jul. 7, 2011 Office Communication in connection with prosecution of AU 2010201896.

\* cited by examiner

SECURE READ-WRITE STORAGE DEVICE

RELATED APPLICATION INFORMATION

The present application is a 35 USC §371 application of PCT/IL2006/001298, filed on 13 Nov. 2006 and entitled "Secure Read-Write Storage Device", which was published in the English language with International Publication Number WO 2007/054942, and which claims the benefit of priority based on Israel Patent Application serial number 171963, filed 14 Nov. 2005.

FIELD OF THE INVENTION

The present invention relates to read write storage (RWS) devices, and more particularly to securing RWS devices in digital rights management (DRM) systems and conditional access (CA) systems.

BACKGROUND OF THE INVENTION

PCT Patent application IL02/00137, published in the English language on 10 Oct. 2002 as WO 02079955 of NDS Ltd., and corresponding U.S. patent application Ser. No. 10/472,286, published on 10 Jul. 2004 as 2004/0111613 of Shen Orr, et al., describes a system and a method for providing variable security mechanisms for securing digital content, in which a single security mechanism is not used for all content. Instead, at least one characteristic or feature of the security mechanism is varied between units, instances or categories of content. Therefore, even if unauthorized access is gained to a single unit of content, the overall integrity and security of the system for content distribution is not compromised. Preferably, security is provided through a general mechanism, which is then varied in order to provide variable, dissimilar security schemes for different types of content. By "type of content", it is meant any of a single unit of content, a single instance of content or a single category of content. For example, for a category of content, the content may be characterized according to the identity of the content itself, such as the title of a movie for example, and/or according to the owner of a particular copy of the content. Thus, different security schemes may optionally and preferably be generated from a particular root structure.

The *Handbook of Applied Cryptography* by Alfred J. Menezes, Paul C. van Oorschot, and Scott A. Vanstone, CRC Press, fifth printing (August 2001), is a well known reference for cryptographers, presenting the techniques and algorithms of greatest interest to the current practitioner, along with the supporting motivation and background material. The book is available on the internet at www.cacr.math.uwaterloo.ca/hac.

The disclosures of all references mentioned above and throughout the present specification, as well as the disclosures of all references mentioned in those references, are hereby incorporated herein by reference.

SUMMARY OF THE INVENTION

Read write storage (RWS) devices are memory components of various types, including volatile memory components, e.g., random access memory (RAM), and non-volatile memory components, for example, and without limiting the generality of the foregoing, RWS devices include hard disk drives (HDD), disk on key devices, flash chips, and so forth. The present invention, in preferred embodiment thereof, is applicable to secure RWS devices, including, but not limited too, HDDs, as well as compact disks (CDs), Digital Video Disks (DVDs), and compact flash memory cards.

A typical RWS device comprises two main components; a controlling logic module, hereinafter the "controller", and a physical storage module, hereinafter the "bit bucket". The bit bucket usually includes the physical storage itself and read/write hardware, for example, electromagnetic read/write hardware for electro-magnetic RWS devices.

In secure systems it is sometimes desirable to employ end-to-end security mechanisms. In many such cases, RWS devices that are used in the secure system may have an active role in the realization of these security mechanisms, and should be well-secured as a link in a chain of end-to-end security.

A non-exclusive list of security mechanisms that may involve RWS devices includes maintaining a secure pairing to a host, establishing a secure channel with the host, authentication of an external party, enforcement of data usage rules, and so forth.

Several solutions have been proposed for securing RWS devices. However, most of the proposed solutions consider the RWS device as an atomic module, to be related to as an entity which acts and is acted upon. The solutions assume that every result or intermediate result on such an RWS is impossible to read or to alter. However, the RWS may sometimes be vulnerable to acts of piracy that read or alter intermediate results. Such acts of piracy are also known as "hacks".

The present invention, in preferred embodiments thereof, seeks to provide an improved RWS device which is more secure than present RWS devices, in the sense that it will be harder to mount pirate attacks on the device. Such pirate attacks typically include code extraction, execution of malicious code, unauthorized reading of stored data, unauthorized writing of data to storage, and so forth.

There is thus provided in accordance with a preferred embodiment of the present invention providing a read-write storage (RWS) device, the RWS device including a controller including a processor, and a bit bucket, and employing, in response to a decision making process, a sanction in the RWS device.

Further in accordance with a preferred embodiment of the present invention the sanction includes disguising data included in the RWS device.

Still further in accordance with a preferred embodiment of the present invention the sanction includes the controller corrupting data included in the RWS device.

Additionally in accordance with a preferred embodiment of the present invention the data which is corrupted includes control data.

Moreover in accordance with a preferred embodiment of the present invention the control data includes at least one of keys, mapping tables, and configuration data.

Further in accordance with a preferred embodiment of the present invention the corruption includes at least one of erasing the data, and overwriting the data with other data.

Still further in accordance with a preferred embodiment of the present invention the overwriting the data with other data includes overwriting the data with meaningless data.

Additionally in accordance with a preferred embodiment of the present invention the overwriting the data with other data includes overwriting the data with faulty data.

Moreover in accordance with a preferred embodiment of the present invention an authorized server is enabled to reverse the corruption.

Further in accordance with a preferred embodiment of the present invention the authorized server includes a private key needed to reverse the corruption.

Still further in accordance with a preferred embodiment of the present invention the authorized server includes a broadcast headend.

Additionally in accordance with a preferred embodiment of the present invention the sanction includes at least one of the controller resetting, and any other part of the RWS device resetting.

Moreover in accordance with a preferred embodiment of the present invention the sanction includes at least one of the controller turning itself off, and any other part of the RWS device turning itself off.

Further in accordance with a preferred embodiment of the present invention the sanction includes all or part of the RWS device entering an infinite loop.

Still further in accordance with a preferred embodiment of the present invention the sanction includes corrupting the data stored in the bit bucket.

Additionally in accordance with a preferred embodiment of the present invention also including a plurality of counters.

Moreover in accordance with a preferred embodiment of the present invention the plurality of counters includes positive counters and negative counters.

Further in accordance with a preferred embodiment of the present invention the positive counters include counters which count successful authentication of code, and counters which count receiving authenticated new versions of software.

Still further in accordance with a preferred embodiment of the present invention the negative counters include events which increase suspicion of an attack on the device.

Additionally in accordance with a preferred embodiment of the present invention the positive counters and the negative counters are used in the decision making process.

Moreover in accordance with a preferred embodiment of the present invention the boot area includes a secure bootloader.

Further in accordance with a preferred embodiment of the present invention also including the secure bootloader employing, in response to a decision making process, a sanction in the RWS device.

Still further in accordance with a preferred embodiment of the present invention the decision making process includes authenticating a boot code.

Additionally in accordance with a preferred embodiment of the present invention the sanction includes disguising data included in the RWS device.

Moreover in accordance with a preferred embodiment of the present invention the sanction includes the controller corrupting data included in the RWS device.

Further in accordance with a preferred embodiment of the present invention the data which is corrupted includes control data.

Still further in accordance with a preferred embodiment of the present invention the control data includes at least one of keys, mapping data, and configuration data.

Additionally in accordance with a preferred embodiment of the present invention the corruption includes at least one of erasing the data, and overwriting the data with other data.

Moreover in accordance with a preferred embodiment of the present invention the overwriting the data with other data includes overwriting the data with meaningless data.

Further in accordance with a preferred embodiment of the present invention the overwriting the data with other data includes overwriting the data with faulty data.

Still further in accordance with a preferred embodiment of the present invention an authorized server is enabled to reverse the corruption.

Additionally in accordance with a preferred embodiment of the present invention the authorized server includes a broadcast headend.

Moreover in accordance with a preferred embodiment of the present invention the sanction includes the controller resetting.

Further in accordance with a preferred embodiment of the present invention the sanction includes the controller turning itself off.

Still further in accordance with a preferred embodiment of the present invention the sanction includes the controller entering an infinite loop.

Additionally in accordance with a preferred embodiment of the present invention the sanction includes corrupting the data stored in the bit bucket.

There is also included in accordance with another preferred embodiment of the present invention a controller including a processor, and a bit bucket, an encryptor operative to encrypt data stored in the bit bucket, and an authenticator operative to authenticate data stored in the bit bucket.

Further in accordance with a preferred embodiment of the present invention the controller is operative to invoke a sanction mechanism.

Still further in accordance with a preferred embodiment of the present invention the sanction mechanism is invoked when data authentication fails.

Additionally in accordance with a preferred embodiment of the present invention the sanction mechanism executes a sanction including disguising data included in the RWS device.

Moreover in accordance with a preferred embodiment of the present invention the sanction includes the controller corrupting data included in the RWS device.

Further in accordance with a preferred embodiment of the present invention the data which is corrupted includes control data.

Still further in accordance with a preferred embodiment of the present invention the control data includes at least one of keys, mapping data, and configuration data.

Additionally in accordance with a preferred embodiment of the present invention the corruption of the data to be corrupted includes at least one of erasing the data, and overwriting the data with other data.

Moreover in accordance with a preferred embodiment of the present invention the overwriting the data with other data includes overwriting the data with meaningless data.

Further in accordance with a preferred embodiment of the present invention the overwriting the data with other data includes overwriting the data with faulty data.

Still further in accordance with a preferred embodiment of the present invention an authorized server is enabled to reverse the corruption.

Additionally in accordance with a preferred embodiment of the present invention the authorized server includes a broadcast headend.

Moreover in accordance with a preferred embodiment of the present invention the sanction includes the controller resetting.

Further in accordance with a preferred embodiment of the present invention the sanction includes the controller turning itself off.

Still further in accordance with a preferred embodiment of the present invention the sanction includes the entering of an infinite loop.

Additionally in accordance with a preferred embodiment of the present invention the sanction includes corrupting data stored in the bit bucket.

Moreover in accordance with a preferred embodiment of the present invention data is stored in the RWS using a secure storage key.

Further in accordance with a preferred embodiment of the present invention an encryption mechanism encrypts the data to be stored using the secure storage key.

Still further in accordance with a preferred embodiment of the present invention an authentication mechanism authenticates the data to be authenticated using the secure storage key.

Additionally in accordance with a preferred embodiment of the present invention the controller also includes non-volatile memory (NVM), and wherein the secure storage key is stored in the NVM.

Moreover in accordance with a preferred embodiment of the present invention the controller also includes read-only memory (ROM), and wherein the secure storage key is stored in the ROM.

Further in accordance with a preferred embodiment of the present invention the controller also includes a plurality of fuses, and wherein the secure storage key is stored in the plurality of fuses.

Still further in accordance with a preferred embodiment of the present invention the secure storage key is generated "on the fly".

Additionally in accordance with a preferred embodiment of the present invention an encryption mechanism includes encrypting the data to be stored using a keyed invertible mixing transformation of the data.

Moreover in accordance with a preferred embodiment of the present invention an encryption mechanism includes encrypting the data to be stored using an unkeyed invertible mixing transformation of the data.

Further in accordance with a preferred embodiment of the present invention an encryption mechanism includes encrypting the data to be stored using a bit density selection method.

Still further in accordance with a preferred embodiment of the present invention the bit density selection method includes an encryption function F (key, data parameters).

Additionally in accordance with a preferred embodiment of the present invention the data parameters are selected from the group including quantity of data, size of data, and address of data.

Moreover in accordance with a preferred embodiment of the present invention F is a function of the form a+(Hash(key, parameters)(mod b)), where a and b are integers.

Further in accordance with a preferred embodiment of the present invention the key of function F is a fixed key.

Still further in accordance with a preferred embodiment of the present invention the key of function F is a non-fixed key.

Additionally in accordance with a preferred embodiment of the present invention the data parameter is the address of the data, and F returns a new address for the data.

Moreover in accordance with a preferred embodiment of the present invention the data parameter is modified by a function G (random, data parameter), where random is a random number.

Further in accordance with a preferred embodiment of the present invention the result of function G is used as input in function F, instead of the data parameter.

Still further in accordance with a preferred embodiment of the present invention a first stored data module of a plurality of stored data modules is secured using a first mechanism different from a second mechanism used to secure other data modules of the plurality of stored data modules.

Additionally in accordance with a preferred embodiment of the present invention the means to secure the plurality of data modules includes a plurality of security methods.

Moreover in accordance with a preferred embodiment of the present invention the means to secure the plurality of data modules includes a plurality of keys.

There is also provided in accordance with still another preferred embodiment of the present invention providing an RWS device, the RWS device including a controller including a processor, and a boot area, and a bit bucket, and employing, at least one of authentication of code, and decryption of code, wherein the employing occurs through at least one of a secure bootloader, dynamic code protection, and a secure code update.

There is also provided in accordance with still another preferred embodiment of the present invention a controller which controls the RWS device, a plurality of positive counters operative to count positive events, a plurality of negative counters operative to count negative events, an assigner which assigns positive and negative events different weighting, the weighting reflecting a significance of an event, a policy utilizing the plurality of positive counters and the plurality of negative counters in a decision making process to determine if sanctions should be applied, and a sanction unit operative to apply at least one sanction chosen from a group of sanctions including causing the controller to turn a part of the RWS device off, causing the controller to reset a part of the RWS device, causing the a part of the RWS device to enter an infinite loop, and corrupting data stored on the RWS.

There is also provided in accordance with still another preferred embodiment of the present invention determining that data included on the RWS device requires corrupting, encrypting the data by a controller, sending a logging module to a server, determining, at the server, that the data may be uncorrupted, as a result of the determining, sending a decryption key to decrypt the data from the server to the controller, and decrypting the data.

There is also provided in accordance with still another preferred embodiment of the present invention the server includes a broadcast headend.

Further in accordance with a preferred embodiment of the present invention the encrypting included encrypting using a public key encryption key.

Still further in accordance with a preferred embodiment of the present invention the decryption key includes a private key.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
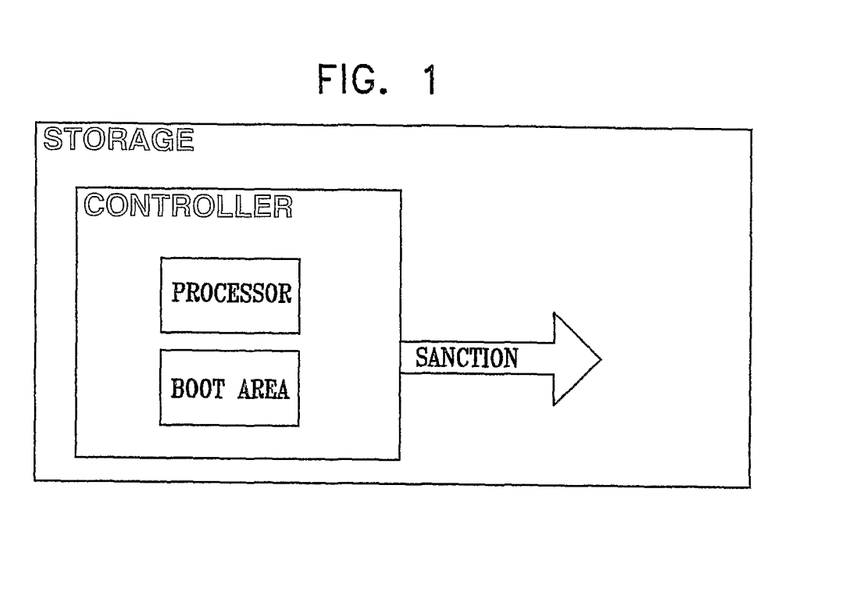
FIG. 1 is a simplified functional block diagram illustration of a read write storage (RWS) device constructed and operative in accordance with a preferred embodiment of the present invention.

Reference is now made to FIG. 1, which is a simplified functional block diagram illustration of a read write storage (RWS) device constructed and operative in accordance with a preferred embodiment of the present invention. When the RWS device boots up, boot code, which is the first code to be executed, applies security measures to other loaded code. The boot code is responsible for loading the other code for execution. At boot time, security measures implemented by the boot code may preferably include decryption and authentication. For example, and without limiting the generality of the foregoing, such security measures may typically include authentication of the other code with a public key digital signature scheme such as RSA (see, for example, *The Handbook of Applied Cryptography*, pages 433-438).

Throughout the present disclosure, the term "secure", as in "a secure read-write storage device", is understood to mean that it will be harder to mount pirate attacks on the RWS device than on present RWS devices. Such pirate attacks typically include, but are not limited to code extraction, execution of malicious code, unauthorized reading of stored data, unauthorized writing of data to storage, and so forth.

The RWS device comprises a controller. The controller comprises at least a processor and a boot area. The boot area preferably comprises either a one time programmable (OTP) memory or a read only memory (ROM). The boot code of the RWS device is preferably stored in the boot area. On booting up, the first code executed by the processor typically comprises the boot code.

Figure 2:
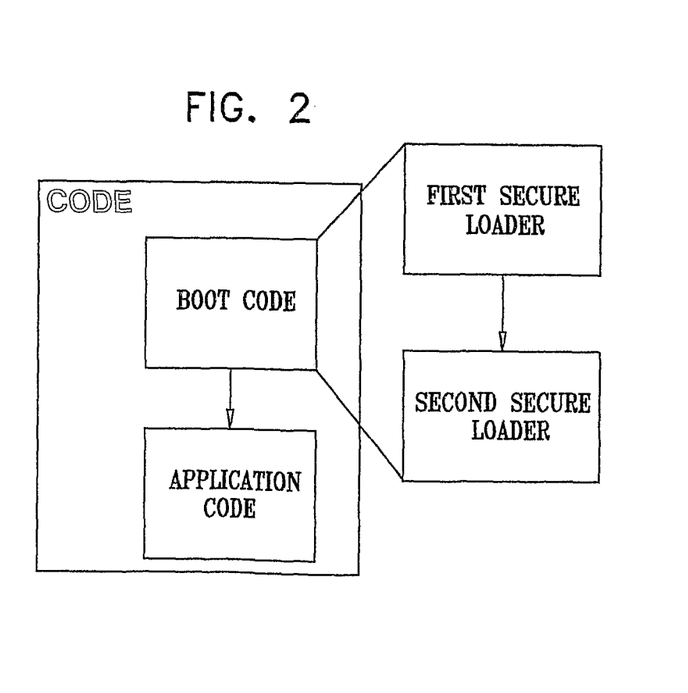
FIG. 2 is a simplified functional block diagram illustration of boot code operative within the RWS device of FIG. 1.

Reference is now additionally made to FIG. 2, which is a simplified functional block diagram illustration of boot code operative within the RWS device of FIG. 1. The boot code typically resides in the boot area. The boot code comprises a first secure loader code that loads other code for execution and applies security measures to it, the security measures preferably comprising at least authentication or decryption. The first secure loader also preferably comprises initialization code, preferably comprising, for example, and without limiting the generality of the foregoing, in the case of a hard disk drive (HDD), code that initializes the disk motor.

A preferred implementation of the secure boot loader preferably comprises at least the following features:
1. Security measures for application code comprising a digital asymmetric signature on the boot code, using a digital signature scheme, such as RSA.
2. A verification key which is preferably stored in the boot area, preferably in a different physical location than the boot code.
3. The first secure loader code preferably does not load application code directly. Rather, the first secure loader code preferably loads a second secure loader code from non-volatile memory (NVM). The first secure loader code preferably applies security mechanisms such as authentication and decryption to the second secure loader code. Once the second secure loader code passes the security mechanisms, the first secure loader code gives control to the second secure loader code. The second secure loader code then preferably loads application code, applies security measures to the application code and gives control to the application code. It is appreciated that the addition of the second secure loader in a chain of code loading allows simplification of OTP/ROM programming, which in turn is an effective measure for easing the production process.

The chain of code loading elaborated above preferably guarantees the integrity of the first secure loader code. The first secure loader code, which is stored in OTP/ROM guarantees the integrity of the second secure loader code. The second secure loader code in turn guarantees the integrity of the application code.

A preferred implementation of the bootloader for a hard disk drive typically comprises:
1. Boot code resides in ROM and includes the first secure loader code.
2. The processor executes the ROM resident boot code, implementing (not necessarily in the order listed below):
   a. regular startup of the controller;
   b. start up of the hard disk drive motor;
   c. secure loading of the second secure loader code from NVM;
   d. reading at least one authentication key from ROM;
   e. authenticating the second secure loader code; and
   f. giving control to the second secure loader code.
3. The second secure loader code preferably:
   a. loads the application code;
   b. loads authentication keys for application code;
   c. authenticates the application code; and
   d. gives control to application code.
4. Whenever there is a need to load a code module from the NVM (for example, and without limiting the generality of the foregoing, when a new application needs to be executed) security measures are preferably applied to code for the new application, and the code for the new application is preferably decrypted and/or authenticated.

It is appreciated that the above list is exemplary, and not intended to be limiting.

In authenticating both the second secure loader code and the application code, successful authentication indicates that control can be given to the authenticated code module, whereas failure means that the code module may be faulty or may have been tampered with, and hence is suspect.

When the code module to be loaded is suspect, the controller may preferably apply sanctions, as explained below. Alternatively, the controller may preferably report the presence of suspect code to an external logging unit.

The secure bootloader further preferably implements dynamic code protection, as explained below, in order to preferably prevent an attack on the RWS device whereby an attacker bypasses the secure bootloader mechanism and changes or reads code after being loaded and before or after being executed. For example, and without limiting the generality of the foregoing, the attacker may attempt to change the code in random access memory (RAM), prior to the execution of the code.

A security processor may preferably be comprised in either the processor or, alternatively, in the controller. If the security processor is comprised in the controller, the security processor is preferably implemented as an additional processor. The security processor continuously verifies the integrity of code that is stored in RAM or NVM. Authentication data, for example, and without limiting the generality of the foregoing, a cyclic redundancy check (CRC), digital signature, or message authentication code (MAC), is preferably added to the code during the writing to RAM or NVM. The security processor preferably checks the integrity of the code through this authentication data. Such checks of the integrity of the code preferably occur prior to execution, during the execution, or at periodic intervals.

The same authentication mechanism is preferably used for both the secure boot loader and the dynamic code protection. For example, the secure bootloader authentication key and methods may preferably also be used for authentication of code in the RAM during execution.

Additionally and preferably, code can preferably be stored encrypted in one or more memories (not shown), and be decrypted immediately prior to being executed.

It is appreciated that some RWS devices may preferably load new code in a possibly hostile environment, for example, and without limiting the generality of the foregoing, in an end-user's home. Therefore, a secure code update mechanism is preferably provided, preferably making the RWS device robust against loading malicious code.

Whenever new code is to be loaded from an external source, security measures are applied to the new code. The new code preferably arrives at the controller encrypted and/or with authentication data. The controller preferably decrypts and/or verifies the authenticity of the new code prior to accepting the new code.

The new code is preferably authenticated using digital signature scheme such as RSA. An internal signature verification public key, preferably stored in ROM is preferably used with the digital signature scheme. When other code authentication mechanisms (for example, and without limiting the generality of the foregoing the secure bootloader and the dynamic code protection mechanism described above) are used, it is preferable to use the same code authentication scheme and to use the same authentication keys for the both the digital signature scheme and for the other code authentication mechanisms.

If the new code fails to be authenticated, the controller may preferably apply sanctions, as explained below. Alternatively, the controller may preferably report the presence of suspect code to an external logging unit.

In some preferred implementations of the present invention, a secure storage regime is implemented in the bit bucket comprised in the RWS device. Implementing the secure storage regime in the bit bucket comprised in the RWS device preferably makes the RWS device robust against attacks that focus on the connection between the controller and the bit bucket, as well as attacks that directly read data from the bit bucket, or directly write data to the bit bucket bypassing the controller.

Prior to writing data to the bit bucket, the controller preferably applies security mechanisms to the data, preferably including encryption using a symmetric key encryption scheme, such as AES, and adding an authentication code, preferably using a symmetric key authentication scheme, such as AES.

At least one of two scrambling options are preferably used to prevent unauthorized reading from the bit bucket. Other appropriate scrambling options, not listed here, may also be used.
1. Scrambling is preferably a digital keyed or unkeyed invertible mixing transformation of the data, such as is used in standard encryption schemes such as DES, AES, RSA, a fixed linear transformation, a standard encryption scheme with a fixed hard-coded key, etc.
2. Scrambling is preferably based on a non-standard keyed or unkeyed storage parameters selection method. "Storage parameters" include, but are not limited to, bit density (a ratio of data to storage area, namely how many bits are stored on each square millimeter of the RWS) of the storage and a physical location of stored data. For example, the storage parameters selection method may be F(key, data parameters) for some function F. Data parameters may preferably be chosen from the group comprising: quantity of data; and logical address of data. An alternative storage parameters selection method may be G (key, data parameters, rnd) for some function G where the data parameters are as defined above and a random number rnd.

A preferred implementation of the function F is in the form: a+(Hash(key, data parameters)(mod b)), where a and b are integers. A preferred implementation of function G is in the form a+(Hash(key, data parameters, rnd)(mod b)), where a and b are integers. For a discussion of Hash functions, see, for example, *The Handbook of Applied Cryptography*, pages 321-383.

Descrambling is implemented appropriately for each of the two scrambling methods described above:
1. The mixing transformation is invertible, and thus the descrambling is "trivial", in the sense that descrambling can easily be carried out because of the invertability of the mixing transformation.
2. When accessing the stored data through a data request, an issuer of the data request needs to provide data parameters with the data request. Where a random number rnd is used (for example, and without limiting the generality of the foregoing, as in the function G) then the data request preferably also provides rnd as part of the data request. Storage parameters are preferably calculated from the data parameters (and rnd when appropriate). The calculated storage parameters are then preferably used to read the stored data.

At least one of two authentication options are preferably used to authenticate data before the data is written to the bit bucket. Other appropriate authentication options, not listed here, may also be used.
1. Authentication information is attached to the data as the result of a keyed or an unkeyed mixing transformation of the data. Without limiting the generality of the foregoing, mixing transformations can be: linear transformation; standard encryption schemes (such as DES, AES, RSA), in some preferred embodiments with a hard-coded key; or hashing the data with a standard hash function (such as MD5 or Sha-1). A MAC (Message Authentication Code) attached to the data is calculated as F(data) of F(data, key), where F is the mixing transformation function. A preferred implementation of function F is in the form: a+(Hash(key, data, data parameters) (mod b)), where a and b are integers and Hash is a hash function. In a preferred embodiment of the present invention a freshness indicator is provided as an additional parameter to function F, so that the authentication is time sensitive, and in order to prevent replay attacks. For example, and without limiting the generality of the foregoing, the freshness indicator can be the value of a counter or a timer which is preferably maintained in the controller. The timer or counter value is accordingly input to the mixing transformation, such that MAC=F (data, time/counter, key (optional)). A preferred implementation of function F is in the form: a+(Hash(key, date, time/counter, data parameters)(mod b)), where a and b are integers.
2. Authentication information is based on a non-standard storage parameters selection method, either keyed or unkeyed, which depends on authenticating data parameters, and also preferably depends on the data and the key. For example, parameters for storage of data on the RWS device may be F (data parameters, data, key (optional)).

Verification is implemented appropriately for each of the two authentication methods described above:
1. Verification is preferably performed by repeating the calculation of the MAC, as above, and comparing the result to the attached MAC. It is appreciated that when a freshness indicator is used, verification also preferably includes a validity check for the time value or counter value.
2. Verification is preferably performed after loading the data to the controller, preferably by repeating the calculation of the MAC and comparing the result to the storage parameters of this data on the RWS device.

Preferred implementations of the sanctions are now discussed in detail.

In order to apply the sanctions, an auditing mechanism needs to be in place, providing tools and a mechanism to decide if the RWS device is presently under attack or has been attacked in the past. The RWS device maintains a plurality of counters reflecting a level of suspicion that the RWS is under attack. Positive counters count positive events. For example, and without limiting the generality of the foregoing, positive events include: successful authentication of code; getting new and well-authenticated versions of software; and so forth. Negative counters count negative events that increase the level of suspicion that the RWS is under attack. Negative events may include, but are not limited to: failure of code authentication; failure in data authentication; and so forth.

It is appreciated that different events may be counted with different weights according to the significance of particular events. For example, and without limiting the generality of the foregoing, a negative event such as failure of code authentication may be counted as being twice as significant as a positive event such as successful authentication of code.

A policy may preferably be implemented in the RWS device such that the counters are utilized in a decision making process to determine whether or not to apply sanctions. The policy may preferably be statically hard-coded in the controller, or alternatively, the policy may preferably be dynamic, so that the policy can be changed by incoming messages, which are preferably secured by being authenticated and/or encrypted. For example, and without limiting the generality of the foregoing, a policy using one set of weights for events may be changed to a policy using a different set of weights for events.

In order to ensure persistence and continuity, it is preferable that at least some of the counters and at least some of the policy are preferably stored in non-volatile memory. However, other counters and other parts of the policy can preferably be stored in volatile memory.

It is appreciated that instead of maintaining an auditing mechanism by itself, the controller may preferably report to a host (not shown) about events and the host preferably maintains an auditing mechanism. In some preferred embodiments of the present invention, the controller may preferably execute the sanctions. In other preferred embodiments of the present invention, the host may execute the sanctions.

A plurality of different sanctions are available when the policy indicates that sanctions should be applied. In addition to the policy, reports of failure of certain authentication mechanisms may provide an immediate indication of an attack requiring applying a sanction as a response.

One preferred implementation of a sanction is the controller turning itself off or resetting itself.

A second preferred implementation of a sanction is the controller entering an infinite loop.

A third, more severe alternative preferred implementation of a sanction is applying data corruption to parts of the data that is stored on the RWS device.

In one preferred embodiment of the third preferred implementation of a sanction, the controller corrupts control data, thereby disabling regular functioning of the RWS device. A non-inclusive list of control data types includes keys, mapping tables (such as logical address to physical address), and configuration data. Data can preferably be corrupted by at least one of: erasing the data to be corrupted; overwriting the data with meaningless data; and overwriting the data with faulty data. For example, and without limiting the generality of the foregoing, configuration parameters may preferably be set to well-formatted but faulty values. Meaningless data is data which lacks any meaning in the context of the system in question. For example, and without limiting the generality of the foregoing, all of the bits can be changed to ones, or all zero bits can be changed to one bits and all one bits can be changed to zero bits.

In a preferred embodiment of the third preferred implementation of a sanction, the data can preferably be corrupted such that only an authorized server (for example, and without limiting the generality of the foregoing, a broadcast headend in a broadcast system) can reverse the corruption. For example, and without limiting the generality of the foregoing, the controller preferably encrypts the control data using a public key encryption scheme such as RSA, in such a way that decryption is only possible by the authorized server which possesses a corresponding private key needed for decryption.

The authorized server may preferably require that the content of the logging module be sent to the authorized server itself for analysis. If the authorized server determines, as a result of analyzing the logging module, that the RWS device may resume functioning normally, the authorized server preferably sends data which is required to enable normal functioning of the RWS device. The data which is required to enable normal functioning of the RWS device is preferably authenticated and encrypted.

An alternative embodiment of the third preferred implementation of a sanction comprises corrupting data stored in the bit bucket comprised in the RWS device. For example, and without limiting the generality of the foregoing, audio-visual content may preferably be corrupted. In some preferred embodiments of the present invention, the controller does not have a secure NVM and needs to use non-unique keys (hard-coded or stored in ROM) or insecure keys. It is appreciated that where the controller does not have a secure NVM, protection is not strong. Thus, in such a case, the data that is stored in the bit bucket comprised in the RWS device is weakly protected. It is therefore preferable to corrupt such data when there is sufficient indication that the RWS device is being attacked.

In both of the above cases of corrupting the control data and corrupting stored data, the data may be corrupted immediately or may be corrupted with a delay. It is appreciated that an act of writing to (and occasionally reading from) NVM is typically easy to observe from the outside, either through voltage measurements (for flash components) or simply by listening (for electromagnetic NVM). If the data is corrupted immediately, the attacker may notice abnormal behavior of the RWS device, such as, for example, the RWS device making seemingly unnecessary write operations. In such a case, the attacker may attempt to thwart a corruption process by powering down the RWS device. The attacker may subsequently try to attack the physical storage. Such a scenario is especially possible in the case of storage data corruption, where the amount of data that needs to be corrupted may be huge.

In some circumstances, the corruption of the data is preferably delayed. In one preferred implementation of a mechanism for corrupting data the controller builds a list of erasure tasks. The list may comprise equal-size or variable-size data chunks. Tasks on the list may be ordered in an arbitrary order or in a specific order. For example, and without limiting the generality of the foregoing, priority may be given to tasks that erase control data. Corruption control information is preferably put in non-volatile memory in order to ensure that the controller performs the erasure task even after a reset occurs. The list itself can preferably be stored in non-volatile memory, in volatile memory, or not stored at all. In case the list does not exist, the controller can preferably build the list of erasure tasks on the fly. When erasing the data, it is preferable to leave some data, such that an outside observer sees seemingly regular behavior of the RWS device. Nevertheless, the controller continues the erasure.

In both the case of immediate data corruption and the case of delayed data corruption, it is preferable to disguise extensive writing of corrupted data with regular writing operations in which non-corrupted data are written to storage. For example, and without limiting the generality of the foregoing, when the RWS device is requested to store a block of size M to the NVM, and for a configuration parameter h (e.g., h=½), the RWS device can write the M-size block and preferably immediately afterwards (or beforehand) corrupts data of size h*M.

Turning now to hardware security, It is appreciated that when the controller is a printed circuit board (PCB), it is highly desirable to harden the PCB against attacks on connections between components on the PCB.

In one preferred embodiment of the present invention, one or more of the components on a chip are preferably connected to the PCB in a Ball-Grid-Array method. Specifically, pins connecting to a controller chip, and pads corresponding to the pins are preferably located under (instead of beside) the controller chip. By implementing the controller chip using the Ball-Grid-Array method, it is substantially more difficult to listen or interfere with signals received and sent on the pins. Furthermore, lines connecting sensitive components on the PCB are preferably buried in the lower layer of the PCB, and thus it is substantially more difficult to listen or interfere with signals on these lines.

Public keys, such as a digital signature verification key are preferably hard-wired or stored in memories that are hard to tamper with (such as OTP memory or ROM). Secret keys, such as decryption keys, symmetric encryption keys and symmetric authentication keys, are preferably unique and are preferably stored in secure NVM. It is appreciated that non-authorized reading from secure NVM can be difficult. For example, and without limiting the generality of the foregoing, the secret keys may be preferably stored in fuses inside a controller ASIC.

Measures are also taken to preserve security when the processor is attacked or hijacked. An attack or hijacking of the processor would be a case where the processor executes code which is malicious code. Additional processors are preferably used in the controller, the additional processors preferably having exclusive access to sensitive data such as encryption or authentication keys, thereby isolating those keys from malicious code in the main processor. Sensitive data may preferably pass, for instance, through dedicated secure buses and not through the main system bus. In an additional preferred implementation of the controller a Direct Memory Access (DMA) module is implemented to move data in memory or between memories with the control of the main processor, but without allowing the data to pass through the processor. Thus, even when the processor executes malicious code, damage which the malicious code can cause is thereby preferably limited.

It is appreciated that controllers of RWS devices may preferably use additional components for storage and processing of the data. For example and without limiting the generality of the foregoing, the controller of the RWS device may use a RAM buffer for storing and processing the stored data.

In order to prevent an attacker from attacking the connection between the controller and the external components, it is preferable, where applicable, to employ security measures on such connections. For example, and without limiting the generality of the foregoing, data such as keys, may be extracted from the connection, or data (such as configuration data) may be changed in the connection. One preferred implementation of a security measure which may be employed on the connection comprises adding an authentication code to data that is stored in an external buffer and checking the authentication code when the data is returned to the controller. Another non-limiting example of such a security measure would be encrypting the data prior to storage and decrypting the data when the data is returned to the controller.

Additionally, it is preferable to avoid transmission of highly sensitive information to external components. For example, and without limiting the generality of the foregoing, in digital content provisioning systems, the controller may store content in an external RAM buffer, but the controller may preferably not store keys or configuration data.

Figure 3:
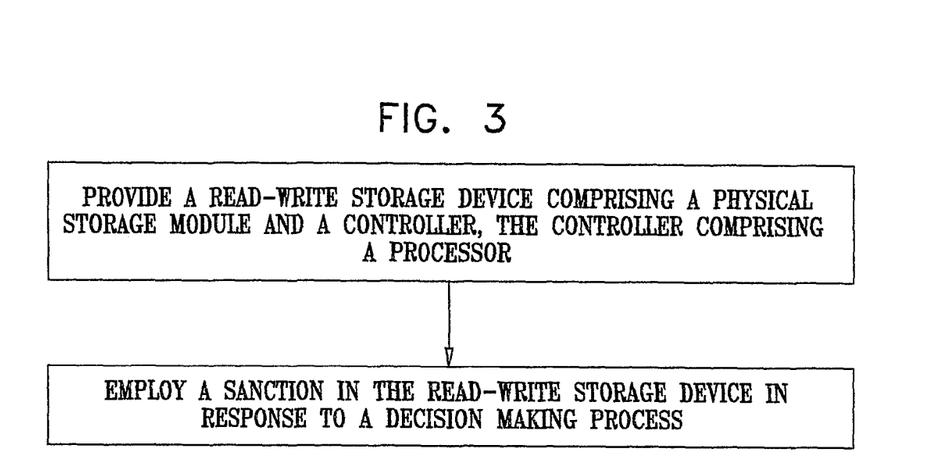
FIG. 3 and FIG. 4 are simplified flowchart illustrations of preferred methods of operation of the system of FIG. 1.
Figure 4:
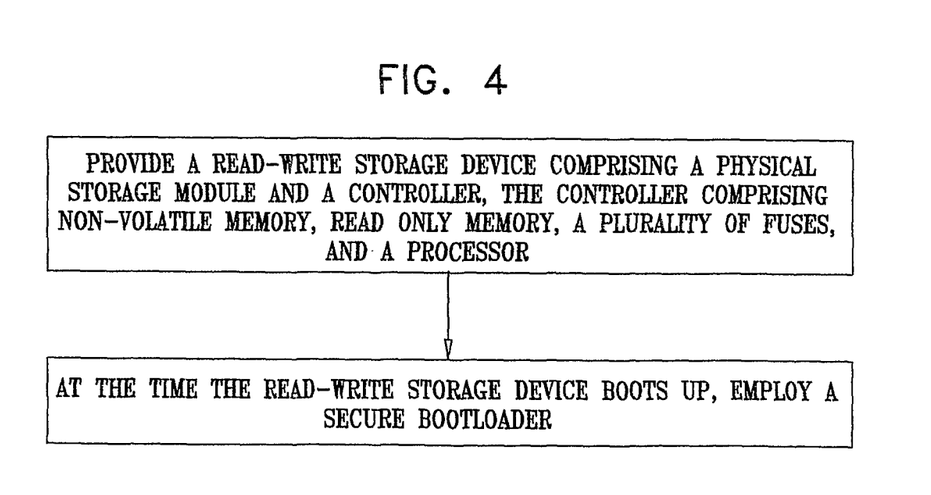

Reference is now made to FIG. 3 and FIG. 4 which are simplified flowchart illustrations of preferred methods of operation of the system of FIG. 1. FIG. 3 and FIG. 4 are believed to be self-explanatory in light of the above discussion.

It is appreciated that various subcombinations of the present invention as described above may each also comprise an alternative preferred embodiment of the present invention. For example, each of the following may comprise an alternative preferred embodiment of the present invention:

the secure boot loader;
the dynamic code protection method;
the secure code update method;
the data scrambling and descrambling mechanisms;
the data authentication and verification mechanisms;
the sanction logging module;
the sanctions mechanisms;
the PCB security methods;
the methods of storing keys; and
the methods of controlling memory access.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A secure storage device (RWS) comprising an auditing mechanism, the auditing mechanism comprising:
a controller comprising a processor and one of: a one time programmable memory unit; and a read only memory, the controller operative to control the RWS device;
a plurality of positive counters operative to count positive events, wherein positive events comprise at least any of: successful authentication of code; and getting new and authenticated versions of software;
a plurality of negative counters operative to count negative events that increase the level of suspicion that the RWS is under attack, wherein negative events comprise at least any of: failure of code authentication; and failure in data authentication;
an assigner which assigns a weighting to each positive event and each negative event, the weighting reflecting a significance of said each positive event and said each negative event;

a policy utilizing the plurality of positive counters and the plurality of negative counters in a decision making process to determine if sanctions should be applied; and a sanction unit operative to apply at least one sanction chosen from a group of sanctions comprising:
  causing the controller to turn a part of the RWS device off;
  causing the controller to reset a part of the RWS device;
  causing the a part of the RWS device to enter an infinite loop; and
  corrupting data stored on the RWS.

2. The device according to claim 1 and further comprising attaching the controller to a printed circuit board (PCB) using a Ball-Grid-Array method.

3. The device according to claim 2 and further comprising obscuring lines connecting the controller to components on the PCB in a lower layer of the PCB.

4. The device according to claim 1 and further comprising appending non-volatile memory (NVM) to a processor comprised in the controller.

5. The device according to claim 4 and further comprising storing secret keys in the appended NVM.

6. The device according to claim 1 and further comprising continuously verifying, at a security processor, integrity of data, the data comprising data stored in RAM or NVM.

7. The device according to claim 6 and wherein the security processor is comprised in a main processor.

8. The device according to claim 6 and wherein the security processor is comprised in the controller.

9. The device according to claim 6 and wherein the verifying comprises verifying at least one of:
  a cyclic redundancy check (CRC) appended to the data;
  a digital signature appended to the data; and
    a message authentication code (MAC) appended to the data.

10. The device according to claim 1 and further comprising:
  additional components provided to the RWS and operative for storage and processing of the data; and
    an encryptor operative to encrypting data stored in the additional components.

11. The device according to claim 10 and wherein the additional storage components comprise a RAM buffer for storing and processing the stored data.

12. The device according to claim 10 and also comprising appending an authentication code to data that is stored in the additional storage components.

13. The device according to claim 1 wherein the sanction comprises causing the controller to reset a part of the RWS device.

14. The device according to claim 1 wherein the sanction comprises causing a part of the RWS device to enter an infinite loop.

15. The device according to claim 1 wherein the sanction comprises corrupting data stored on the RWS.

16. A secure storage device (RWS) auditing method, the method comprising:
  controlling the RWS device;
  counting positive events at a plurality of positive counters;
  counting negative events at a plurality of negative counters;
  assigning a weighting to each positive event and each negative event, the weighting reflecting a significance of said each positive event and said each negative event that increase the level of suspicion that the RWS is under attack, wherein positive events comprise at least any of: successful authentication of code; and getting new and authenticated versions of software, and negative events comprise at least any of: failure of code authentication; and failure in data authentication;
  utilizing a policy comprising the plurality of positive counters and the plurality of negative counters in a decision making process to determine if sanctions should be applied; and
  applying at least one sanction chosen from a group of sanctions comprising:
    causing the controller to turn a part of the RWS device off;
    causing the controller to reset a part of the RWS device;
    causing the a part of the RWS device to enter an infinite loop; and
    corrupting data stored on the RWS.

17. A secure storage device (RWS) comprising an auditing mechanism, the auditing mechanism comprising:
  means for controlling the RWS device, the means for controlling the RWS device comprising a processor and one of: a one time programmable memory unit; and a read only memory;
  means for counting positive events at a plurality of positive counters, wherein positive events comprise at least any of: successful authentication of code; and getting new and authenticated versions of software;
  means for counting negative events at a plurality of negative counters that increase the level of suspicion that the RWS is under attack, wherein negative events comprise at least any of: failure of code authentication; and failure in data authentication;
  means for assigning a weighting to each positive event and each negative event, the weighting reflecting a significance of said each positive event and said each negative event;
  means for utilizing a policy comprising the plurality of positive counters and the plurality of negative counters in a decision making process to determine if sanctions should be applied; and
  means for applying at least one sanction chosen from a group of sanctions comprising:
    causing the controller to turn a part of the RWS device off;
    causing the controller to reset a part of the RWS device;
    causing the a part of the RWS device to enter an infinite loop; and
    corrupting data stored on the RWS.

\* \* \* \* \*

UNITED STATES PATENT AND TRADEMARK OFFICE
CERTIFICATE OF CORRECTION

PATENT NO. : 8,417,963 B2  
APPLICATION NO. : 12/083023  
DATED : April 9, 2013  
INVENTOR(S) : Mantin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 815 days.

Signed and Sealed this
Sixteenth Day of December, 2014

Michelle K. Lee
*Deputy Director of the United States Patent and Trademark Office*